United States Patent [19]
Dallmann et al.

[11] Patent Number: 5,322,244
[45] Date of Patent: Jun. 21, 1994

[54] SUPPLY SYSTEM FOR PASSENGER AIRCRAFT

[75] Inventors: Andreas Dallmann, Hamburg; Hans-Juergen Mueller, Henstedt-Ulzburg; Wilfried Sprenger, Issendorf, all of Fed. Rep. of Germany

[73] Assignee: Deutsche Aerospace Airbus GmbH, Hamburg

[21] Appl. No.: 32,125

[22] Filed: Mar. 17, 1993

[30] Foreign Application Priority Data

Mar. 17, 1992 [DE] Fed. Rep. of Germany ....... 4208438
Mar. 17, 1992 [DE] Fed. Rep. of Germany ....... 4208478

[51] Int. Cl.⁵ ............................................. B64D 11/04
[52] U.S. Cl. ............................. 244/118.5; 244/118.1; 414/392
[58] Field of Search .................. 244/118.5; 186/40, 46, 186/47, 49, 50, 51; 414/282, 392, 399

[56] References Cited

U.S. PATENT DOCUMENTS

| Re. 32,176 | 6/1986 | Vernon | 244/118.5 |
| 4,055,317 | 10/1977 | Greiss | 244/118.5 |
| 4,660,787 | 4/1987 | Sprenger et al. | |
| 4,804,307 | 2/1989 | Motoda | 414/282 |
| 5,074,496 | 12/1991 | Rezag et al. | 244/118.5 |

FOREIGN PATENT DOCUMENTS 4029628 10/1991 Fed. Rep. of Germany .

Primary Examiner—Michael S. Huppert
Assistant Examiner—Anne E. Bidwell
Attorney, Agent, or Firm—W. G. Fasse; W. F. Fasse

[57] ABSTRACT

A supply system for passenger aircraft uses one or more catering containers which are loaded with the aid of the aircraft's loading system into the cargo hold of the passenger aircraft and positioned in vertical alignment with a supply distribution and work cabin on the passenger deck or floor of the aircraft. A horizontal conveying system is capable of moving transport carts or standardized packages in the directions of a rectangular coordinate system for bringing carts or packages into a lifting position. A vertical lift cooperates with the horizontal conveyor system for bringing trolleys initially held in the carts or standardized packages into the distribution and work cabin. Instead of equipping the catering container with a horizontal conveyor system that works in the X- and Y-direction, it is possible to use any other robot system for retrieving standardized packages and/or trolleys from the catering container.

22 Claims, 10 Drawing Sheets

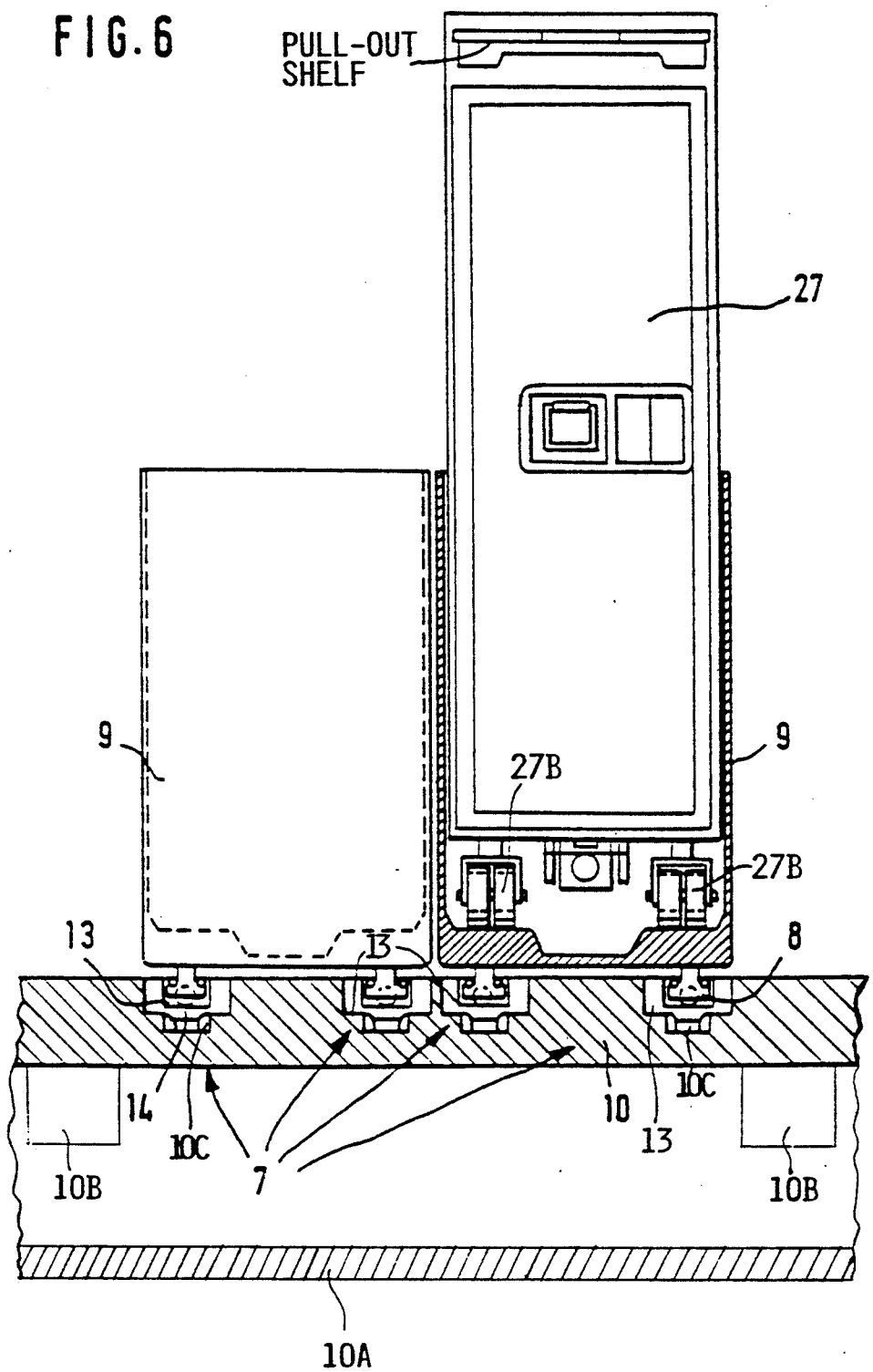

SUPPLY SYSTEM FOR PASSENGER AIRCRAFT

FIELD OF THE INVENTION

The invention relates to a supply system for passenger aircraft. The system may be computer aided and constructed for a semiautomatic or a fully automatic operation. A flight attendant work area for distributing supplies is arranged in a cabin space on a floor that separates the cabin space from a cargo space below. The work area includes a plurality of push or pullable transport trolleys, kitchen equipment, and a waste collection area. All components of the flight attendant work area are preferably arranged as a galley.

BACKGROUND INFORMATION

Conventional passenger supply systems for passenger aircraft are mostly arranged in the cabin space on the floor separating the cabin space from a cargo space below. Such an arrangement generally involves a loss in the available seating capacity of the aircraft. In order to increase the space available for the installation of seats it is known to install at least a portion of the passenger supply system in the cargo space below the floor. One such a conventional system is described in German Patent Publication DE 4,029,628 C1 (Traber et al.), published on Oct. 17, 1991, disclosing a conveying system for use in aircrafts for the purpose of transporting supply trolleys back and forth between the passenger deck and the freight deck. The known system comprises containers which are adapted with their dimensions to the supply trolleys, and these containers are movable by endless conveyors formed of chain conveyors, or roller or gear belt conveyors. The conveyors in German Patent Publication 4,029,628 includes conveyor sections which individually permit either a horizontal or vertical movement of the supply containers. The known system must be customized for each individual aircraft type. Such a requirement is not economical and becomes especially unsatisfactory if the same aircraft is intended to accommodate a substantially variable number of passengers, depending on demand. For example, the same aircraft may be used for scheduled flights and for charter flights. The number of passengers in charter flights usually frequently corresponds to a full capacity, but the available supply space does not change. Thus, a more efficient use of the available supply volume is very desirable.

U.S. Pat. No. 4,660,787 (Sprenger et al.), issued on Apr. 28, 1987, discloses a food supply system for an aircraft, wherein a lifting mechanism in the cargo hold can lift any one of a number of supply trolleys from a platform on the lower cargo deck into a pantry on the upper passenger deck. However, bringing the lifting mechanism into alignment with any one of a large number of supply trolleys requires a rather involved construction which nevertheless is rather limited in its ability to permit a horizontal displacement of the supply trolleys.

OBJECTS OF THE INVENTION

In view of the foregoing it is the aim of the invention to achieve the following objects singly or in combination:

to provide a supply system for passenger aircraft which is capable of efficiently supplying a full capacity number of passengers without requiring more cabin space for the supply system, and to actually free additional cabin space for further seats;

to supply the food and related items in such a way that the equipment needed in the galley can be minimized to achieve a real weight reduction;

to construct the supply system as a modular system which can be adapted to different aircraft types, to the wishes of the purchaser of the aircraft, and which takes full advantage of currently available technology, especially with regard to a computer controlled semiautomatic or fully automatic operation;

to provide a sensor and monitoring system with a display screen that will display the position of individual transport carts in a catering container;

to provide a catering system, especially for an aircraft, which uses available space more efficiently to substantially increase the catering capacity in terms of numbers of passengers that can be served, without structurally changing the basic features of the aircraft;

to standardize packages of food items in such a way that multiples of basic dimensions will provide packages of different sizes which fit into a catering container substantially without waste of space in the catering container; and to use standardized dollies and covers for holding standardized packages in such a way that conventional trolleys are no longer needed.

SUMMARY OF THE INVENTION

The above objects have been achieved according to the invention in that the aircraft's freight loading system in the cargo space below the passenger space receives a catering container in vertical alignment with a flight attendant work space in the passenger cabin for distributing supplies, wherein the catering container includes an integrated horizontal conveying system and preferably also an integrated waste holding space in said catering container. The catering container is held in a fixed position in a location below the distribution or flight attendant work area for cooperation with a horizontally stationary vertical lift that moves supply containing trolleys vertically out of transport carts that form part of the catering container and into the distribution work area. The horizontal conveyor moves each cart individually to an "empty" location also referred to as a stationary lift position vertically aligned with the vertical lift. The vertical lift moves up and down in the same horizontal position and does not require any endless conveyor chains or belt, whereby space is saved. Further, by using transport carts that hold the supply trolleys in the catering container, the drive and guide rail system in the catering container can be constructed with due regard to the transport requirements within the catering container and without regard to the requirements that must be met by the supply holding trolleys which must be capable of being pushed or pulled along the aisles of the passenger cabin of an aircraft. By separating the transport requirements in the catering container from the transport requirements in the aircraft aisles, each requirement can be more efficiently satisfied. A computer controls the separate horizontal conveyor and the separate horizontally stationary lift for moving said trolleys in a sequential order or in a random order.

According to a modified embodiment of the invention the catering container is provided with at least two floors, each incorporating a horizontal conveyor system so that the catering container can hold packages of standardized dimensions on two horizontal conveyor systems instead of the above described carts. Each standardized container is separately movable to the so-called "empty" position in which it is picked up by the vertical lift for transport to the distribution and work area where the standardized packages are placed either manually or automatically onto a dolly, whereby a single package of standardized dimensions or a plurality of single packages also of standardized, but smaller dimensions, make up the dimensions of a standard trolley when the packages are covered by a countertop element that simultaneously forms a cover and a work surface. The dollies and the covers are normally stored in the distribution and work cabin and take up less space than trolleys.

The above mentioned packages that fill the catering container have standardized dimensions which are so selected that one or more packages with these dimensions, together with the dolly and the countertop element make up the volume of a standard trolley, so that stacks of such packages can be stored in the catering container substantially without any lost space for carts. The catering container is divided into heated zones and into cooled zones so that packages with respective contents that need to be heated or cooled, can be placed into respective heated or cooled zones of the catering container, which zones are equipped with respective Peltier-elements for the heating or cooling. Preferably, a program controlled robot transports the packages, such as food packages, from the catering container to the distribution and work cabin. The packages have closable openings for removal of the content and are preferably reusable.

BRIEF DESCRIPTION OF THE DRAWINGS

In order that the invention may be clearly understood, it will now be described, by way of example, with reference to the accompanying drawings, wherein:

FIG. 6 shows a view, partially in section, of the horizontal conveyor system within a catering container;

DESCRIPTION OF PREFERRED EXAMPLE EMBODIMENTS AND OF THE BEST MODE OF THE INVENTION

Figure 1:
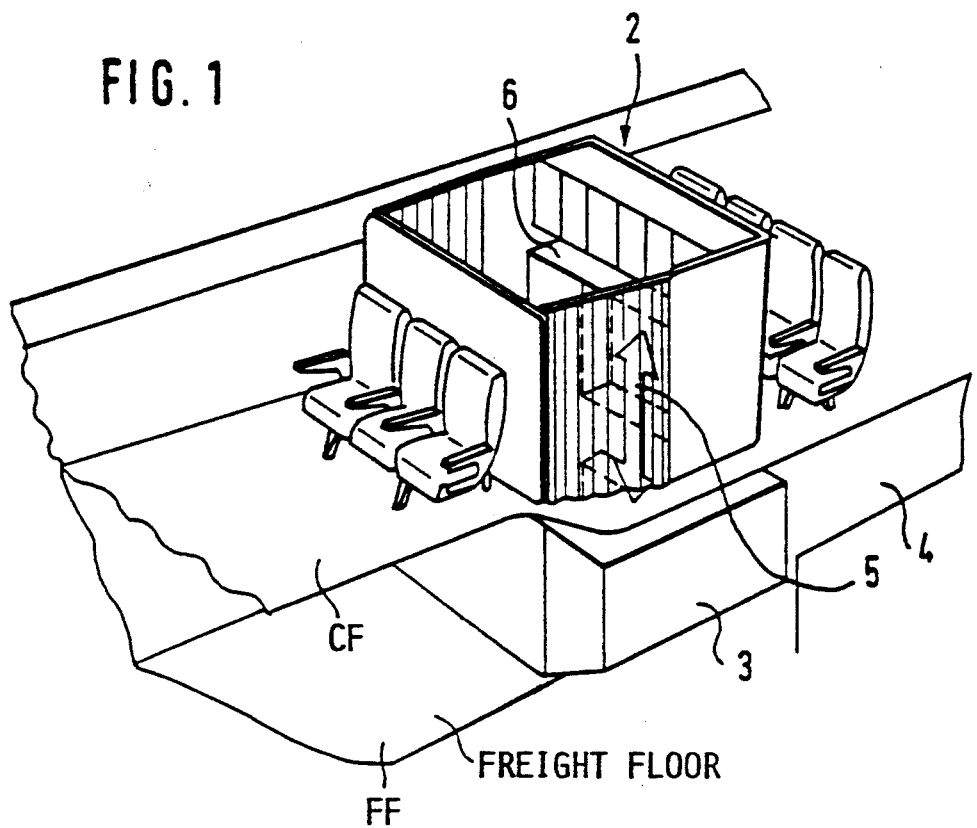
FIG. 1 is a partial perspective view of a supply distribution and work cabin on the cabin floor of a passenger aircraft in vertical alignment with a catering container held on the freight floor of an aircraft, according to the invention.

FIG. 1 shows a supply system 2 according to the invention for supplying the passengers of a passenger aircraft with food and beverages. The system 2 comprises a catering container 3 according to the invention arranged in vertical alignment with a supply and distribution work cabin 6 which is arranged on the cabin floor CF while the catering container 3 is arranged on the freight floor FF forming a lower deck cargo loading area 4. A vertical lift 5 symbolically shown by an arrow connects the catering container 3 with the distribution and work cabin 6.

Figure 2:
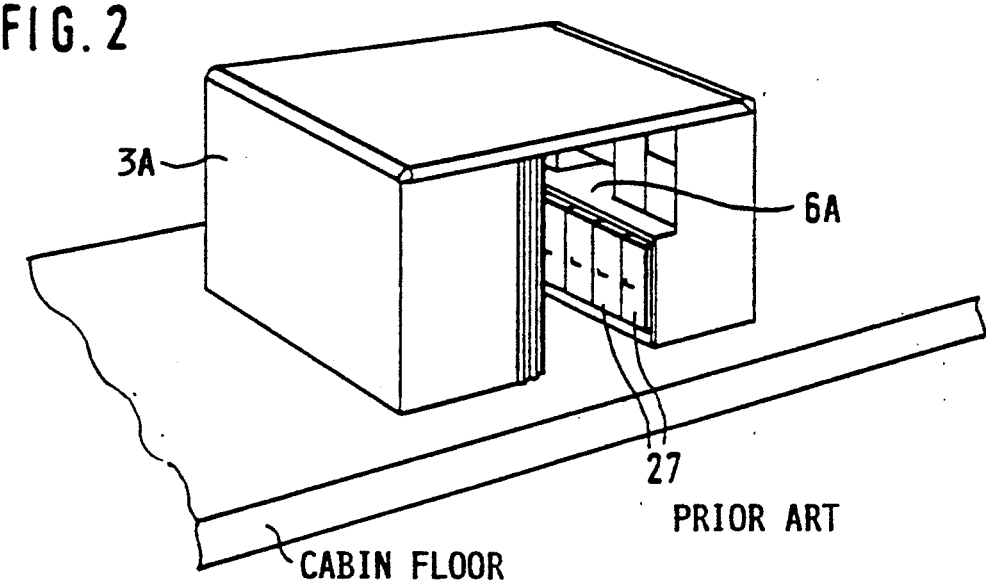
FIG. 2 is a perspective view similar to that of FIG. 1, however showing a prior art galley on the cabin floor with a catering container forming part of the galley on the same floor.

FIG. 2 illustrates, on the same scale as FIG. 1, a conventional work cabin or kitchen 6A combined with a catering container 3A on the same floor, namely the cabin floor. Since the same scale is used in FIGS. 1 and 2, it is evident that the arrangement of FIG. 2 requires more cabin floor space than the arrangement of FIG. 1 according to the invention. FIG. 2 shows conventional supply trolleys 27 which are pushable or pullable along the aisles of an aircraft. The present invention also uses these conventional trolleys 27 in one embodiment.

Figure 3:
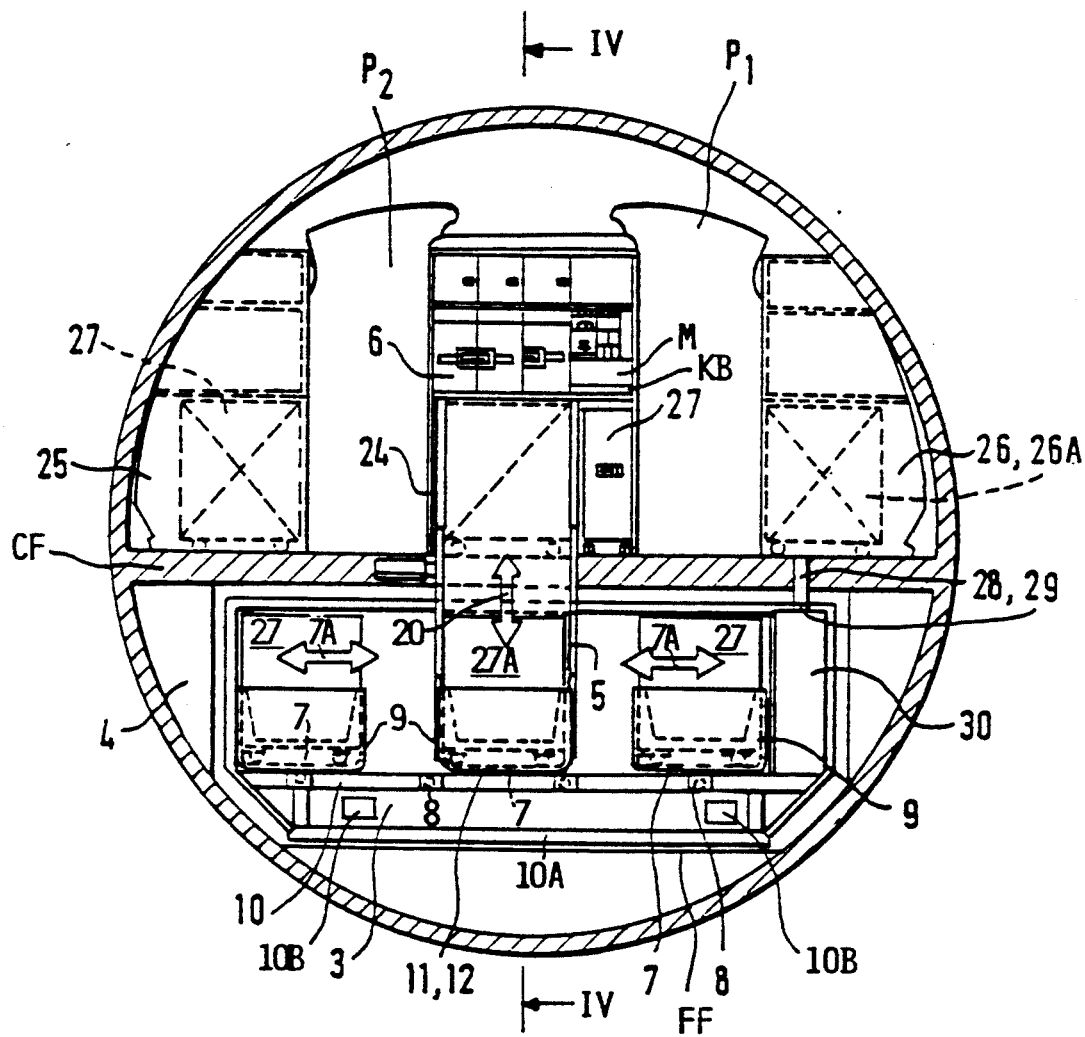
FIG. 3 shows a vertical cross-section through an aircraft body perpendicularly to its longitudinal axis through the supply distribution and work cabin and through the catering container according to FIG. 1.
Figure 4:
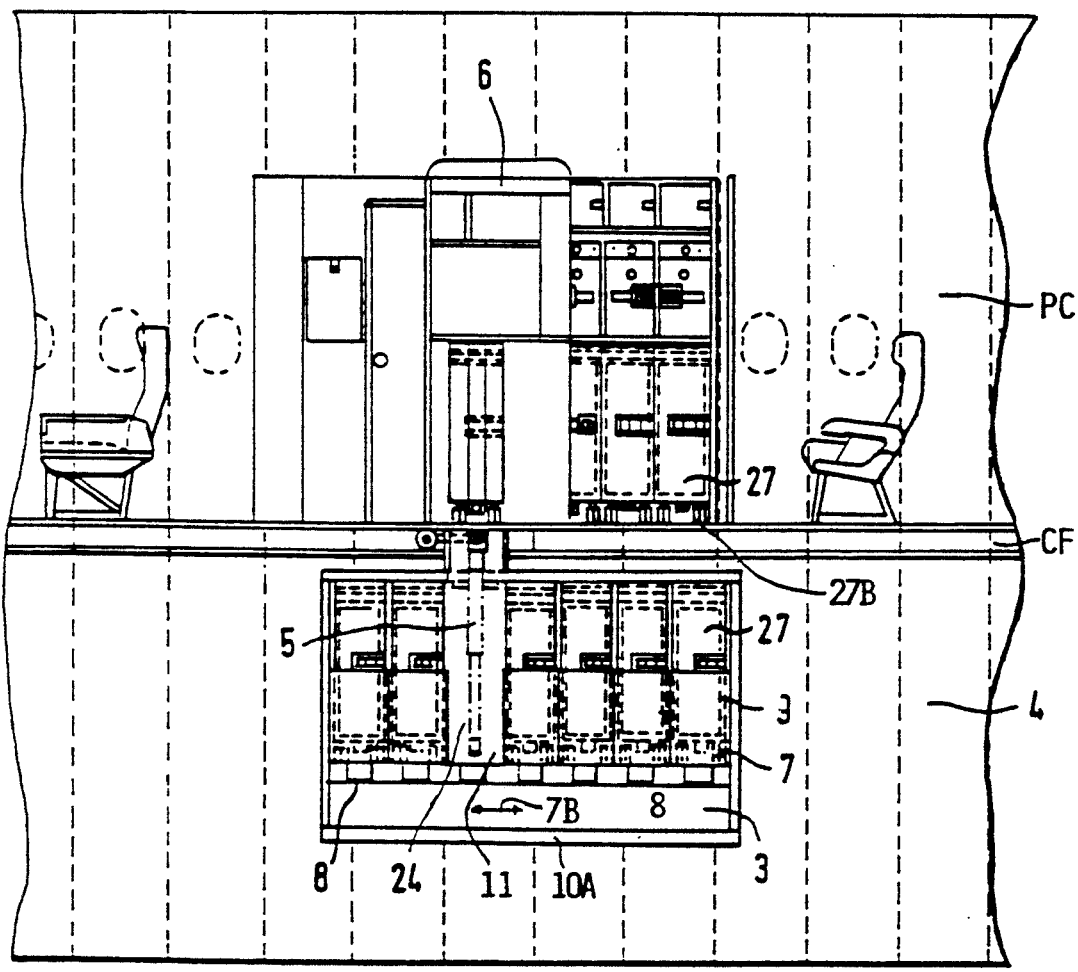
FIG. 4 is a vertical section through FIG. 3, approximately along section plane IV—IV in FIG. 3.

FIGS. 3 and 4 show further details of the present system. The vertical lift 5 with its drive means 20 is arranged in a lift shaft 24 passing through the cabin floor CF. At least one, if necessary several, catering containers 3 are removably installed in the lower deck area 4 and can be removed out of the aircraft by the conventional loading system forming part of the freight floor FF. The catering container 3 is operatively connected to the aircraft system. More specifically, mechanical, electrical, and electronic connections are provided so that the standardized catering container or containers 3 are under the control of the aircraft's central computer system CCS. Since all catering containers 3 are standardized and generally the same, it is sufficient to describe but one such container and its modification in the following.

Referring further to FIG. 3, the distribution and work cabin 6 is arranged between two aisles P1 and P2, whereby additional, temporary parking spaces 25 and 26 are provided for conventional supply trolleys 27 and for waste holding trolleys 26A respectively. Waste contained in a trolley 26A is fed through a duct 28 having an odor confining closure 29 into a waste container 30 in the catering container 3. The catering container 3 has an intermediate floor 10 and a subfloor 10A forming an intermediate space with control units and sensors 10B, which in turn are connected to the central computer system CCS in the cockpit. The units 10B include drive motors for rollers 10C to be described below with reference to FIG. 6. The floor 10 comprises a guide rail and roller system forming a horizontal conveyor system 7 also to be described below. The horizontal conveyor system 7 transports carts 9 each holding a trolley 27 within the catering container 3 to a so-called "empty" position 11 which is vertically aligned with the lift 5 for transporting individual trolleys 27 into the distribution and work cabin 6. As shown in FIG. 3, the trolley 27A is now in the position for being transported into the cabin 6. The horizontal conveyor system transports the carts 9 in the direction of the arrows 7A and also perpendicularly thereto as indicated by the arrows 7B in FIG. 4.

FIG. 4 shows that each supply trolley 27 in the catering container 3 is received in its own transport cart 9 while the trolleys 27 in the work cabin 6 are removed from their transport carts 9 so that in the passenger cabin PC the trolleys 27 are moved on their own rollers 27B along the cabin. floor CF of the passenger cabin PC. In the embodiment of FIG. 4, the transport carts 9 remain permanently in the catering container 3. The dashed line position of the lift 5 shows how the lift 5 reaches down the lift shaft 24 to pick up a trolley 27 out of its transport cart 9 when the latter is moved into the so-called normally "empty" lift position 11.

Figure 5A:
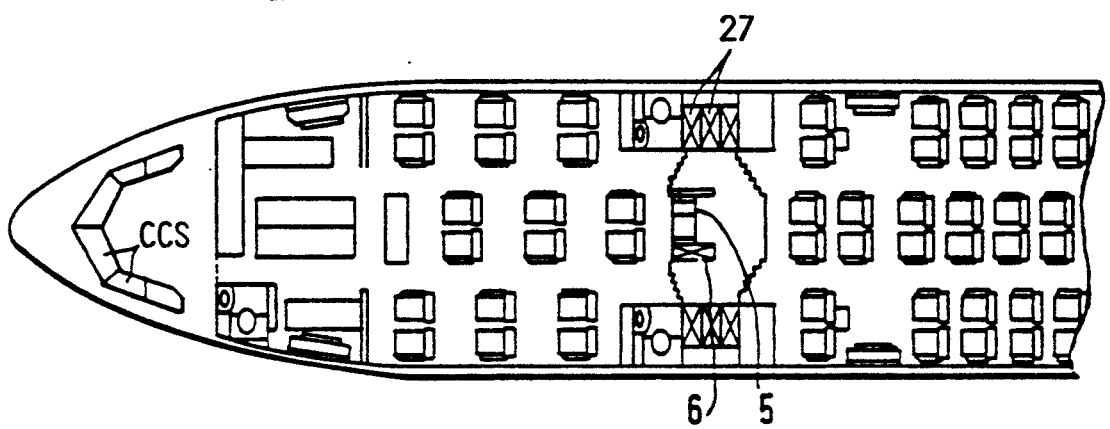
FIG. 5A is a simplified plan view of the passenger deck of an aircraft showing particularly the area where the supply distribution and work cabin is located.
Figure 5B:
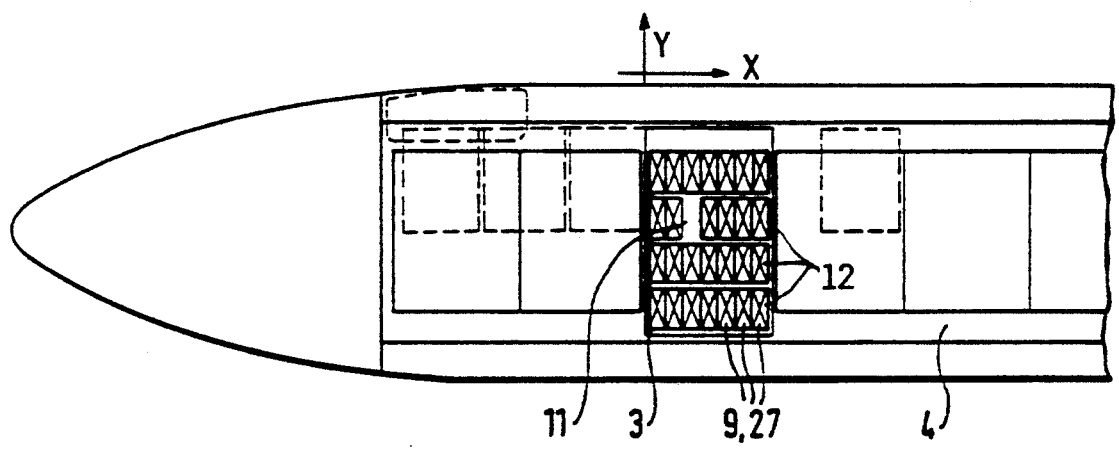
FIG. 5B is a plan view onto the freight floor of a passenger aircraft showing the position of the catering container vertically below the work and distribution cabin.

FIGS. 5A and 5B show the empty position 11 in the catering container 3 aligned with the position of the lift 5 in the work cabin 6. When a catering container 3 is initially loaded, the position 11 remains empty for permitting the proper shifting of the carts 9 on the floor 10 of the catering container 3 by means of the horizontal conveyor system 7. FIG. 5B shows that except for the empty position 11, all other positions 12 in the catering container 3 are initially filled with carts 9 and with trolleys 27. After the content of the trolleys 27 has been used up, they are returned into the carts 9 which remain in the catering container 3 at all times, as mentioned.

Figure 7:
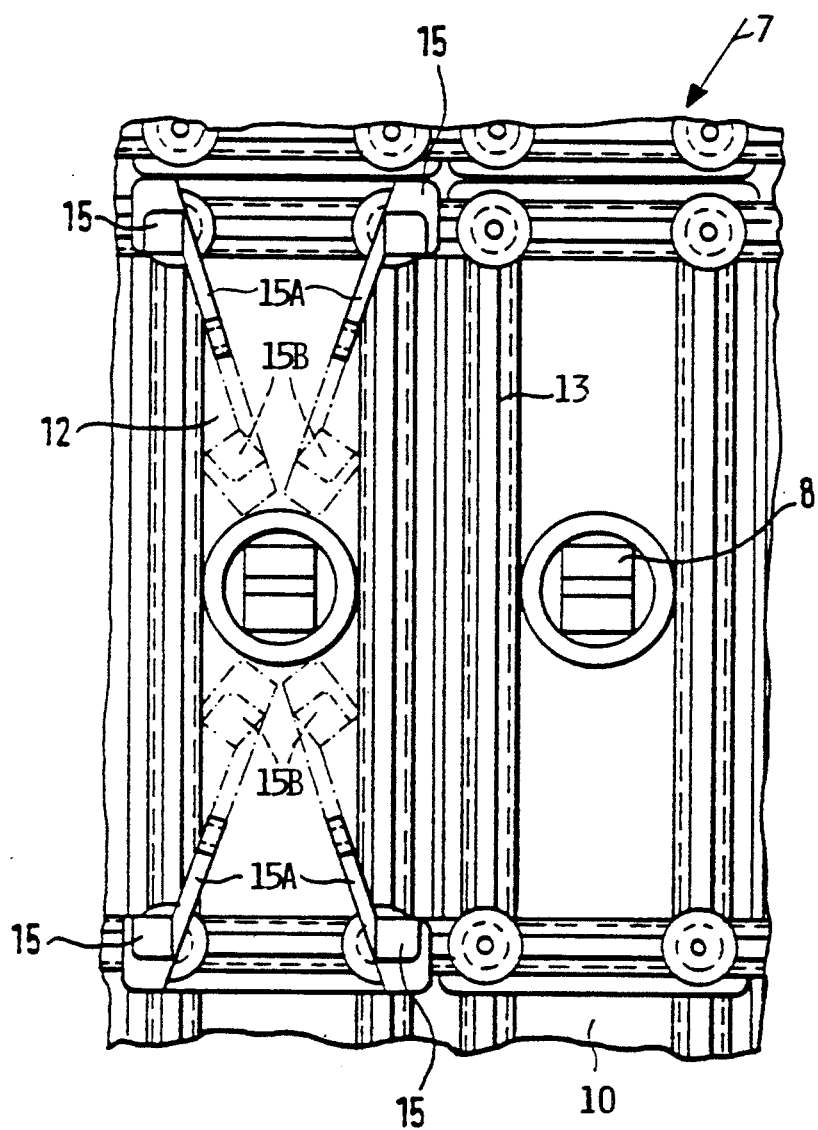
FIG. 7 shows a view vertically downwardly onto the rail system that forms an integral part of the horizontal conveyor system in each catering container showing a cart location and the "empty" location in vertical alignment with a vertical lift into which a transport cart must be brought for lifting its supply trolley into the supply distribution and work cabin, the "empty" location also shows a locking device for the transport carts in all cart locations.

FIGS. 6 and 7 show further details of the horizontal conveyor system 7 comprising a rail grid structure 13 in which junction or crossing switches 14 are so arranged that the carts 9 can either be moved in the X-direction or in the Y-direction on the floor 10. The rail grid structure may be supported in or on the floor 10. Crossing switches 14 are operated in accordance with a computer program stored in the memory of the central computer system CCS of the aircraft and executed by the control devices 10B. A manual control from the keyboard in the work cabin 6 is also possible, thereby overriding a program sequence. Each cart 9 is equipped with rollers 8, preferably in the form of double rollers that are tiltable about vertical axes by 90° for movement in the X-direction or in the Y-direction. These rollers 8 engage rollers 10C in the rail system 13 and the rollers 10C are positively driven by the electric motors of control units 10B.

The above mentioned program sequence controlled by the aircraft central computer system CCS assures that the shortest possible distances are traversed by the carts 9 to reach the empty position 11 where the lift 5 will remove the trolley 27 to lift it into the work cabin 6. This computer controlled sequence also assures minimal time durations for obtaining access to the content of the trolleys. A monitor M indicates on a TV screen the position of any particular cart 9 within the coordinate system X, Y established by the rail structure 13. For this purpose the monitor M with its keyboard KB is wired to the CCS of the aircraft. The CCS also provides information regarding the content of each trolley 27 or series of trolleys 27. The keyboard KB enables a flight attendant to override an automatic trolley retrieving sequence so that any particular trolley 27 can be retrieved.

Referring further to FIG. 7 the normally "empty" lift position or location 11 in the horizontal conveyor system 7 comprises a locking mechanism 15 with four arms 15A operated by drive means 15B in such a way that in the locked condition of the locking mechanism 15, all carts 9 are prevented from moving in any direction. In the unlocked position one cart at a time may be moved into the so-called empty position 11 for retrieval of a full trolley or an empty trolley may be returned. The locking mechanism 15 will be locked, for example, during starting and landing.

When the locking mechanism 15 is unlocked, it is recessed into the floor 10, whereupon the first cart can be moved into the empty position 11 for pick-up by the lift 5. Upon completion of a meal distribution, for example, the space 11 is again free of its cart and trolley, whereupon the locking mechanism 15 is lifted so that all carts 9 are locked against movement in any direction. Thus, the horizontal conveying system 7 is protected against any static or dynamic loads that may occur, especially during starting or landing. The locking mechanism 15 and the crossing switches 14 are driven by electric motors.

Figure 8:
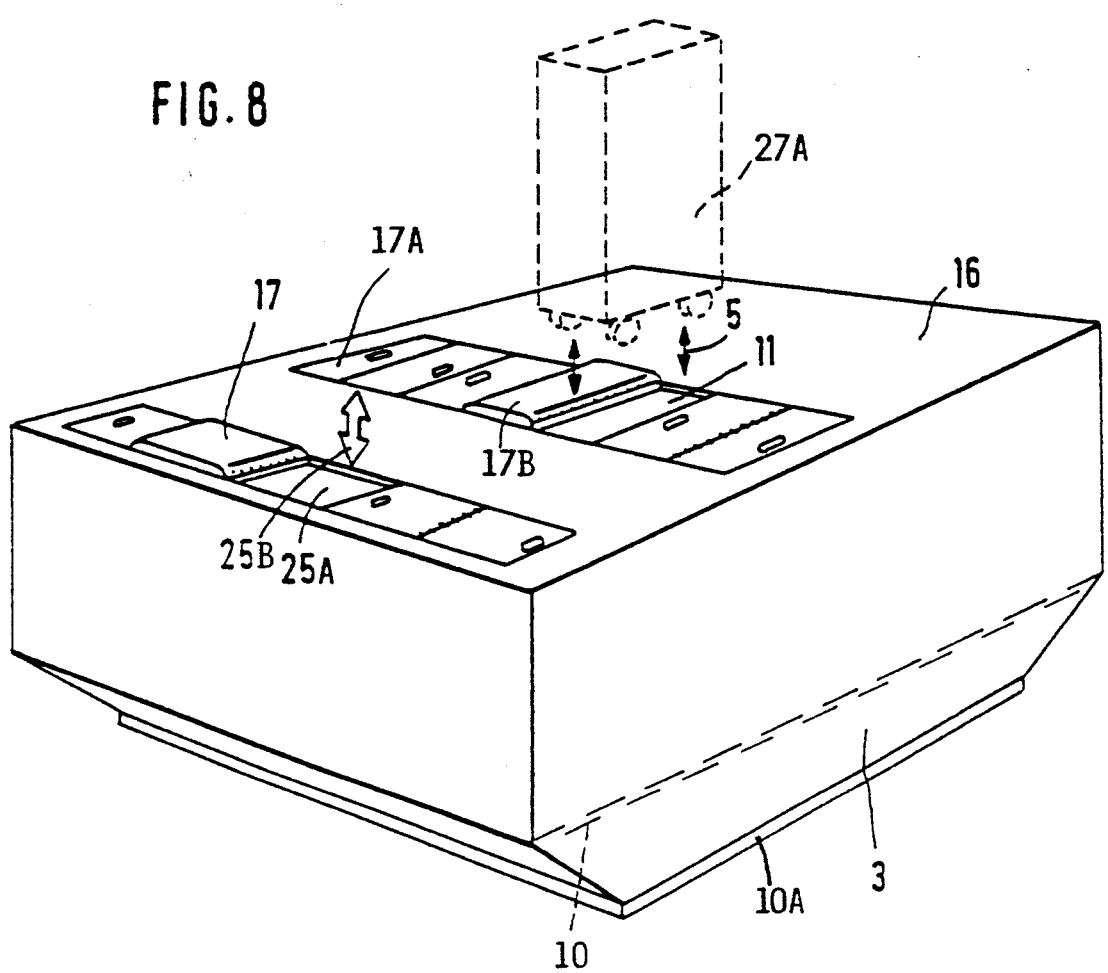
FIG. 8 is a perspective view of a catering container according to the invention.
Figure 9:
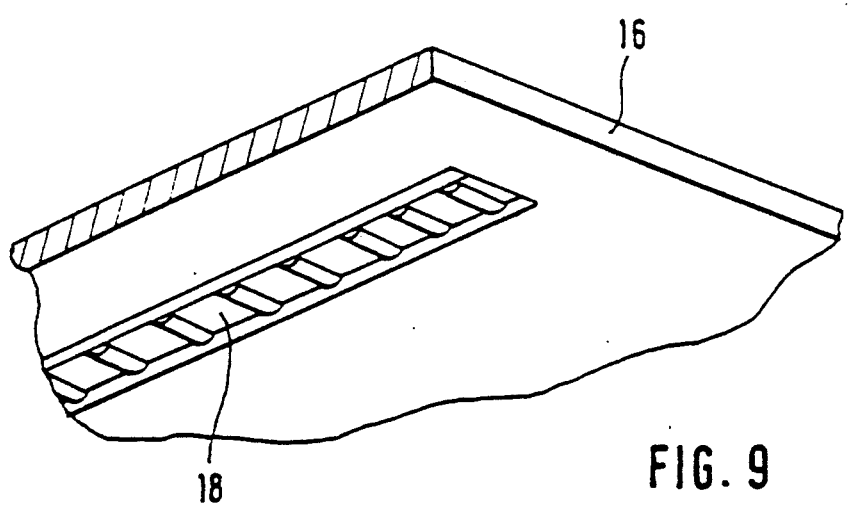
FIG. 9 illustrates a perspective partial view of a cover for a catering container according to the invention, wherein the cover is provided with roller tracks for guiding trolleys moving in the catering container.

Referring to FIGS. 8 and 9, the catering container 3 comprises a cover 16, the inwardly facing side of which is provided with roller tracks 18 for properly guiding the trolleys 27 in their carts 9 when these trolleys are moved on the above described rail structure 13 inside the catering container 3. As shown in FIG. 8 the cover 16 is also provided with a plurality of individual lids 17 and 17A. Preferably, these lids are of a few standardized sizes. Lid 17B covers, for example, the empty lift position 11 so that the lift 5 can enter into the lift position 11 and retrieve a trolley 27A or return a trolley 27A into a cart 9 in position 11. The lid 17 shown in an open position opens and closes an inlet 25A for a chute 25B through which waste material may be dropped into the waste container 30 shown in FIG. 3. The chute 25B passes through the cabin floor CF. The lid 17 may be provided with a sliding fit to slide over the opening 25A.

The lift shaft 24 for the lift 5 is vertically aligned with the position 11 in the catering container 3 and safely encloses all moving portions of the lift 5 and of a trolley 27A being retrieved thereby protected against contacting any portions of other aircraft body structures and against injuring a person.

Further, lids 17A, 17B are motor controlled in response to the movement of the lift 5. Thus, e.g. lid 17B opens when the lift 5 moves downwardly, and it is closed again when the lift 5 moves upwardly out of the range of the position 11.

Incidentally, the roller tracks 18 in the downwardly facing surface of the cover 16 of the catering container 3 prevent any jamming of the carts 9 and trolleys 27 as they are moved inside the catering container.

Figure 10:
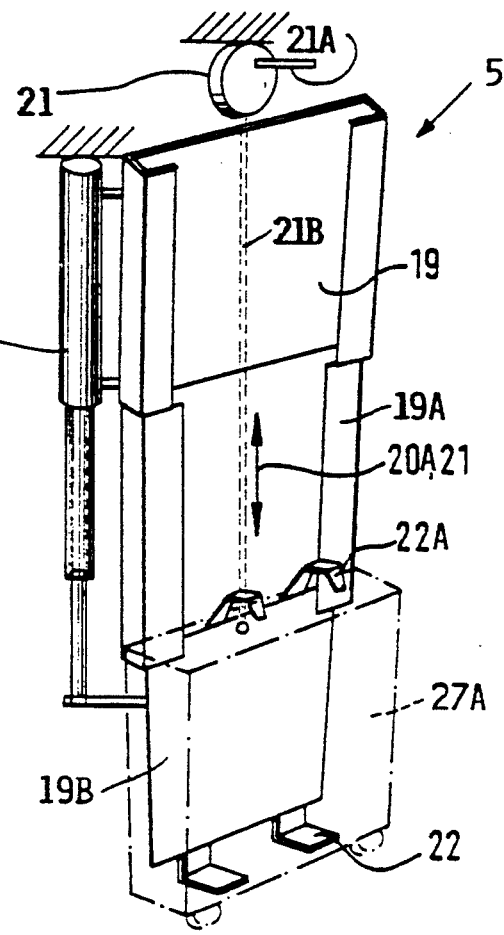
FIG. 10 is a perspective view of the vertical lift forming part of the transport system according to the invention.

FIG. 10 shows the lift 5 constructed as a three section telescoping lifting device comprising a stationary section 19 mounted in the work cabin 6 and two telescoping sections 19A and 19B movable up or down as indicated by the double arrow 20A. A drive mechanism 20 lifts or lowers the sections 19A and 19B. The drive mechanism 20 may, for example, be a piston cylinder device shown in FIG. 10 or an electric motor 20B shown in FIG. 11. These drive mechanisms are conventional and as such not part of the invention. An emergency drive mechanism 21, such as a winch or the like, with a handle 21A is provided for manually lifting or lowering the sections 19A, 19B by means of a rope or cable in case of an emergency caused by a power failure or the like. The lift 5 is movably or at least elastically mounted in the shaft 24 so that any impact loads, for example, caused by the landing of the aircraft can be taken up or damped. The lower lift section 19B is provided with automatically and/or manually operable claws 22 for lifting a trolley 27A out of a cart 9. For this purpose, the lateral sides of the carts are provided with respective gaps so that the claws 22 may grip into the carts 9. The claws 22 are tiltable and/or spring biased.

Figure 11:
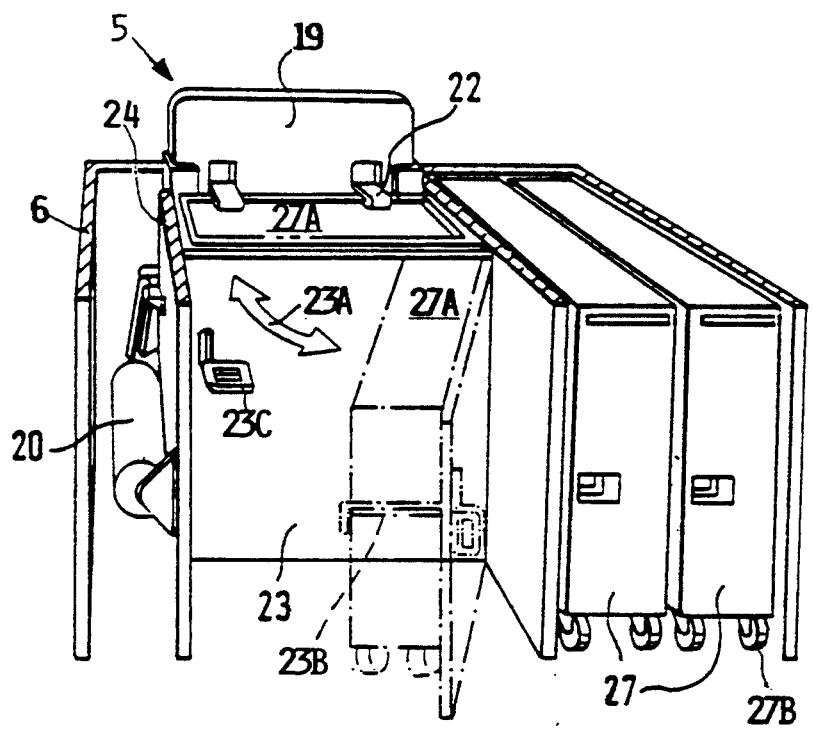
FIG. 11 illustrates the discharge portion of the lift shown in FIG. 10, whereby a door for the discharge opening is constructed to remove a trolley from the discharge opening when the door is opened.

Referring to FIG. 11, the upper end of the lift shaft 24 is provided with a door 23 that can be opened and closed as indicated by the arrow 23A. The full line position shows the door 23 closed, while the dash-dotted position shows the door open. The door 23 is equipped with a hook 23B and a handle 23C that operates the hook 23B to pull out a trolley 27A when the door is opened, as shown in dash-dotted lines in FIG. 11. The upper claws 22A are preferably spring biased so that a pull on the handle 23C permits retrieving the trolley 27A. The biased claws 22A are hinged to 19B.

It should be mentioned here that the distribution and work cabin 6 is otherwise conventionally equipped in the manner of conventional aircraft pantrys. However, according to the invention, heating equipment and refrigeration equipment in the pantry may be minimized, because, as will be described below with reference to FIG. 13, a modification of a catering container according to the invention comprises heated and cooling zones. Thus, the above mentioned weight reduction in the pantry may be achieved.

Incidentally, the above mentioned odor confining closure 29 in the chute 28 is preferably motor driven. Several such chutes 28 with the respective odor excluding closure 29 may be installed in the cabin floor CF in the temporary parking areas 25 and 26, whereby the catering container according to the invention will be provided with a plurality of waste containers 30, preferably made of plastics material that is easily cleaned.

Rather than equipping the catering container itself with heating and refrigeration devices, it is also possible to install such devices in at least some of the trolleys 27, whereby the required power is provided by plugging the trolleys into the power supply system of the aircraft while the trolleys are in the catering container 3. Conventional Peltier-elements may be used in the trolleys for this purpose.

Figure 12:
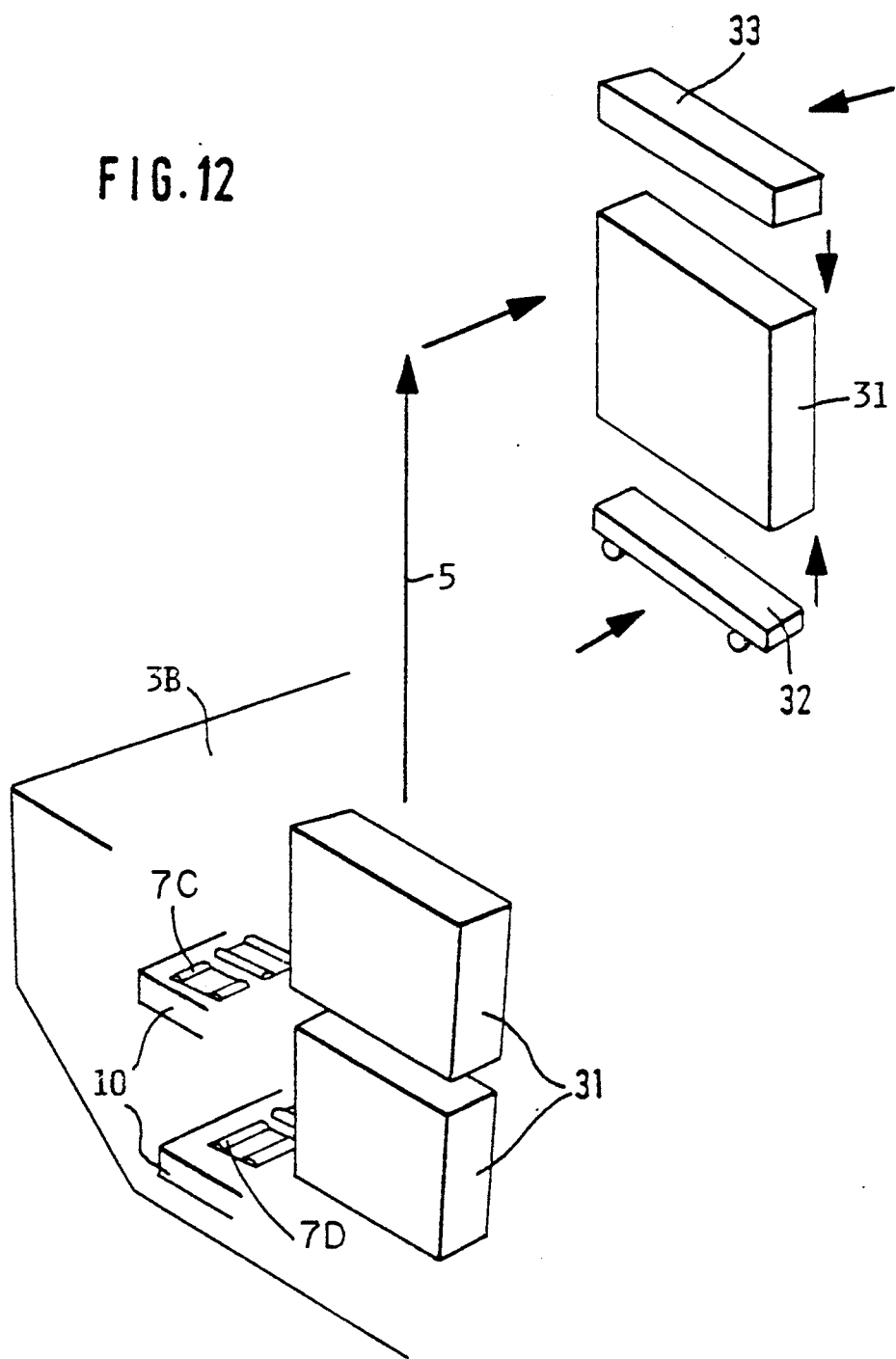
FIG. 12 is a perspective view of standardized packages that together with a dolly and a cover perform the same function as a trolley.

FIG. 12 shows a catering container 3B according to the invention, which is substantially the same as the container 3 in FIG. 1, with the exception that in the container 3B there are two floors 10, each of which is equipped with its own horizontal conveyor system 7C or 7D for transporting standardized packages 31. The packages 31 are transported on rollers in the X- and Y-direction on each of the floors 10, whereby again a so-called empty position 11 will be provided on each floor. The lift 5 is so dimensioned that it can reach both floors. By avoiding the carts 9 and the trolleys 27, a substantial increase in the fill factor is achieved. The fill factor is the ratio of the total volume of the packages 31 to the interior volume of the catering container 3B. Compared to the embodiment of FIG. 1, the increase in the fill factor is about 75% in the embodiment of FIG. 12. Each of the standardized containers 31 is transported into the distribution and work cabin 6, where so-called trolleys are assembled by setting each package 31 on a dolley 32 and covering the package with a countertop element 33. The dolley 32, the package 31, and the top 33 are held together by conventional means, such as clamps or the like not shown. The dolley 32 and the cover element 33 are kept in stock in the cabin 6, or in the temporary parking areas 25, 26. The assembly of the elements 31, 32, and 33 can be accomplished manually, semiautomatically, or automatically. The assembled units with the elements 31, 32, and 33 are so dimensioned that they are somewhat smaller than the trolleys 27, thereby even improving their ability to pass along the aisles in the aircraft. The packages 31 are preferably made of synthetic plastic materials that can be reused and easily cleaned. The package 31 may hold a plurality of smaller packages described below.

The catering container 3B also has a cover as shown in FIG. 9. The cover is removable on the ground and each horizontal transport conveyor floor 10 can then be individually assembled with the packages 31 and inserted into the container 3B. Conventional overhead equipment is used for this purpose.

Figure 13:
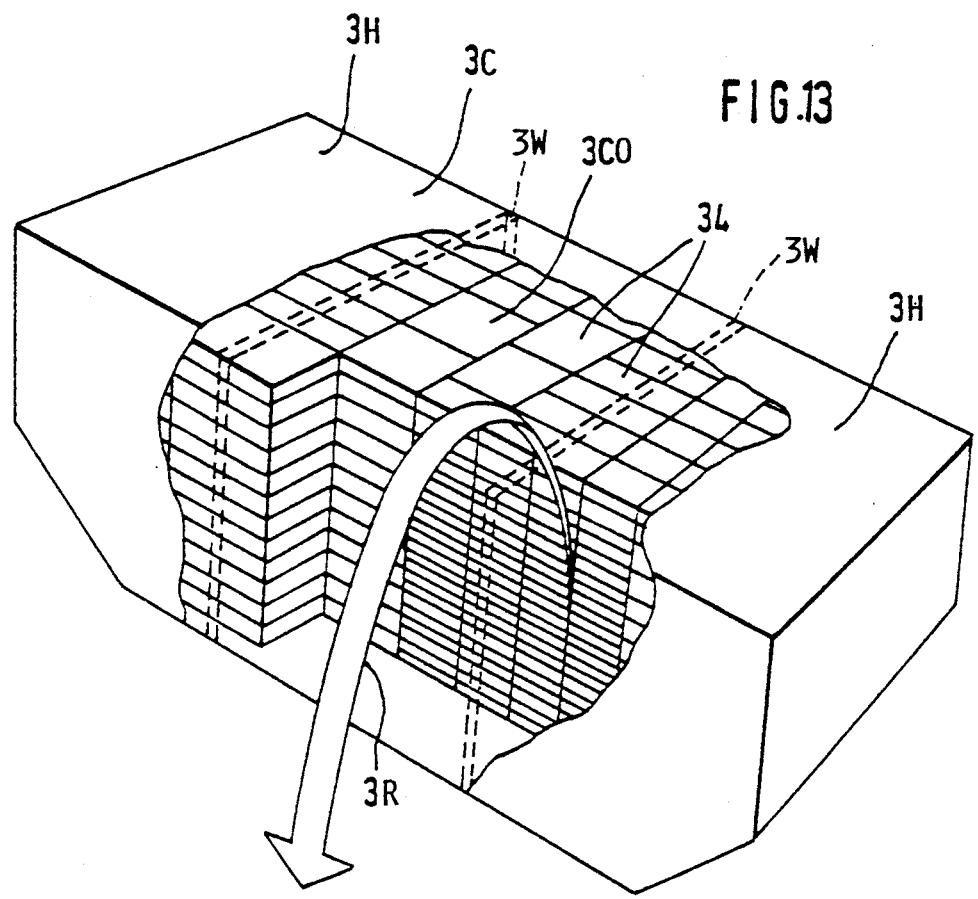
FIG. 13 shows a perspective view of a catering container of the invention filled with standardized packages rather than with transport carts and trolleys.

FIG. 13 shows another embodiment of a catering container 3C for holding standardized packages to be described below with reference to FIG. 14. The container 3C is divided into three sections. Two sections 3H are equipped with a heating device for keeping the packages at a required temperature. A third section 3CO is equipped with a refrigerating device to keep the packages 34 at a desired cooled temperature. The zones 3H are separated from the zone 3CO by insulating wall sections 3W. The container 3C is shown without a horizontal conveyor system. The container 3C may be filled and emptied manually or a conventional robot system 3R may be used for this purpose. Since the robot system 3R is conventional, its details are not illustrated.

In the catering container 3C of FIG. 13, the fill factor is even further improved compared to the embodiment of FIG. 1. Specifically, about 140% more packages can be placed in the container of FIG. 13, compared to the container of FIG. 3, even though both containers have the same volume. This is possible, because virtually no space is taken up for equipment, except for the cooling and heating equipment and for the insulating dividing walls 3W. The omission of the horizontal conveyor system saves a substantial amount of space in the embodiment of FIG. 13, and so does the avoidance of carts 9 and trolleys 27.

All three container embodiments are equipped with the necessary plug-in connections for the electrical supply and for the communication with the central computer, the monitor M, and keyboard KB.

Figure 14:
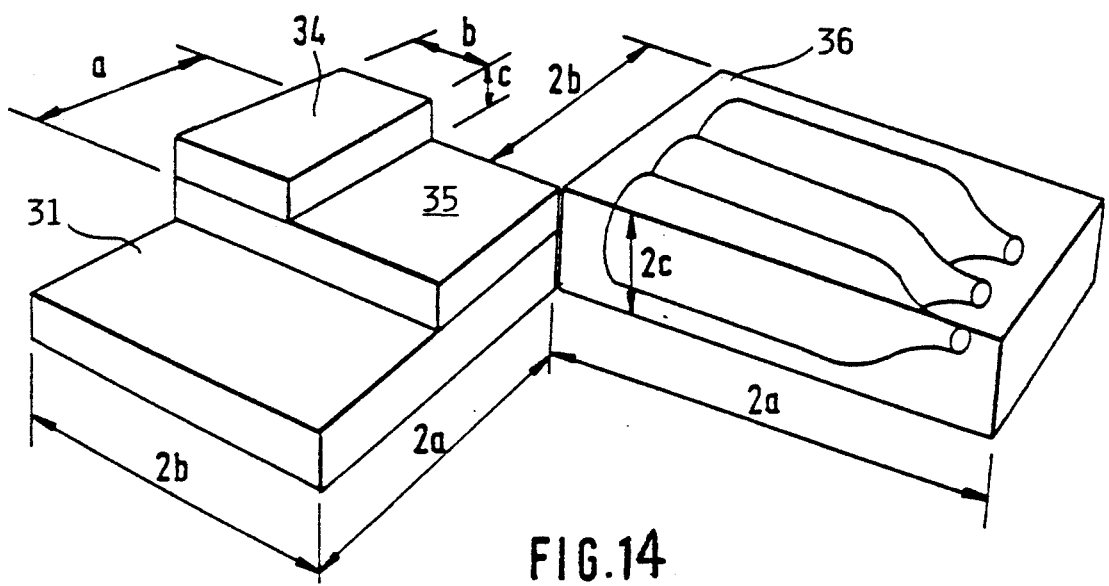
FIG. 14 is a perspective view of standardized package dimensions to illustrate that multiples of basic dimensions provide standardized packages of different sizes.

FIG. 14 illustrates a standardized packaging system according to the invention. The resulting packages fit into the trolleys of the first embodiment or the packages may form a trolley as described above with reference to FIG. 12. A basic package 34 has the dimensions a.b c. Packages may increase in size by whole number multiples of any of these dimensions. Thus, the package 35 is twice as large as the package 34 by increasing the dimension b. The package 31 is four times as large as the basic package 34 by doubling the dimensions a and b. Similar considerations apply to the package 36.

Although the invention has been described with reference to specific example embodiments it will be appreciated that it is intended to cover all modifications and equivalents within the scope of the appended claims.

What we claim is:

1. A supply system for passenger aircraft comprising a cabin space, a cargo space, a floor separating said cabin space from said cargo space, a flight attendant work area (2) on said floor in said cabin space for distributing supplies, a catering container (3) including a container floor as part of a freight loading system in said cargo space vertically below said work area (2), a plurality of trolleys for containing supplies, horizontal conveyor means including a stationary lift position mounted to said container floor in said catering container for horizontally moving said trolleys into and out of said lift position in said catering container, said lift position having a surface area sufficient to support one trolley at a time, said system further comprising horizontally stationary vertical lift means extending through said floor in vertical and horizontal alignment with said lift position so that said vertical lift means are horizontally confined within said surface area of said lift position for vertically transporting said trolleys one at a time from said lift position (11) into said work area and vice versa, said horizontal conveyor means in said catering container comprising transport carts (9) for said trolleys, and wherein said supply system further comprises a computer and sensor means including control means connected to said computer, to said horizontal conveyor means, and to said vertical lift means for operating said supply system.

2. The system of claim 1, wherein said horizontal conveyor means comprise a rail structure (13) supported by said container floor, said lift position forming part of said rail structure, a bottom (10A) in said catering container, a hollow space between said container floor (10) and said bottom, electric control and sensor means (10B) in said hollow space for moving said transport carts on said rail structure, each of said transport carts comprising cart roller means (8) for rolling on said rail structure when said transport carts are driven by said electric control means, and swivel means mounting said cart roller means to said transport carts for swivelling said cart roller means through an angular range of at least 90°, whereby said transport carts are movable on said rail structure along X-Y directions crossing each other at 90° for moving each transport cart (9) in said catering container (3) from a storage position into said lift position (11) and vice versa.

3. The system of claim 2, wherein said rail structure (13) comprises crossing switches (14), said rail structure guiding said cart roller means with a low friction contact between said rail structure and said cart roller means, and wherein said crossing switches (14) control with their instantaneous position an advance of said transport cart in but one of two possible directions (X or Y).

4. The system of claim 1, wherein said catering container (3) and said transport carts (9) comprise electric heating means positioned for heating supplies contained in said trolleys.

5. The system of claim 1, further comprising a locking mechanism (15) forming part of said horizontal conveyor means, said locking mechanism being located in said lift position (11) of said horizontal conveyor means, and means for operating and controlling said locking mechanism for locking all carts on said horizontal conveyor means and for releasing said carts for individually moving a cart into said lift position (11).

6. The system of claim 5, further comprising a rail structure (13) forming said horizontal conveyor means and crossing switches (14) in said rail structure, said supply system further comprising operating means (10B) for operating said locking mechanism and said crossing switches (14) in accordance with a program stored in said computer or in response to signals initiated by an operator on a keyboard (KB).

7. The system of claim 1, wherein said catering container comprises a waste holding area and a cover (16) closing said catering container, said cover comprising at least two access openings and respective lids (17, 17A) for closing said access openings, one of said lids providing access to said lift position, another of said lids providing access to a waste container or bag in said waste holding area.

8. The system of claim 7, wherein said catering container cover comprises roller tracks (18) on an inner side of said catering container cover for guiding said carts with their trolleys when a cart is being moved inside said catering container.

9. The system of claim 1, wherein said horizontally stationary vertical lifting means comprise a telescoping lift mechanism having several telescoping sections (19A, 19B) and a controllable drive means (20) for lifting and lowering said telescoping sections in vertical alignment with said stationary lift position (11).

10. The system of claim 9, wherein said telescoping sections of said horizontally stationary vertical lift means have a lowermost section (19B) comprising claws (22) for holding a trolley, said vertical lift means further comprising a vertical lift shaft (24) having an upper discharge end with a discharge opening and a door (23) for closing said discharge opening, said door (23) comprising a hook (23B) operable by a door handle (23C) for engaging a trolley lifted into alignment with said discharge opening to thereby retrieve said trolley from said vertical lift means by operating said handle and opening said door (23).

11. The system of claim 1, wherein said attendant work area (2) comprises a distribution and work cabin (6) installed on said floor vertically above said catering container (3), said work cabin (6) comprising countertop sections forming a work surface, and wherein laterally next to said cabin (6) across aisles in said cabin space there are provided temporary parking or holding spaces (25, 26) for said trolleys, for waste containing trolleys, for heating devices, and similar equipment.

12. The system of claim 11, further comprising at least one chute (28) passing through said cabin floor from said parking spaces (25, 26) into a waste holding area of said catering container, and a motor controlled odor excluding closure (29) in said chute (28).

13. The system of claim 12, wherein said odor excluding closure (29) in said chute leads into a waste container (30) in said waste holding area of said catering container.

14. The system of claim 1, wherein said sensor means comprise sensor elements for monitoring said supply system said control means being responsive to said sensor elements for performing conveying and lifting operations, said supply system further comprising at least one display screen (M) and a keyboard (KB), and means interconnecting all components of the system with an aircraft central computer system for permitting an operator to override a program controlled operational sequence to perform a manually controlled operation.

15. The system of claim 1, wherein said trolleys comprise means for controlling a temperature of a content of a trolley, said temperature control means including Peltier-elements.

16. The system of claim 1, wherein said horizontal conveyor means comprise two horizontal conveyor systems (7C and 7D) arranged in said catering container (3B), each horizontal conveyor system having one said stationary lift position (11) aligned with said vertical lift means for horizontally transporting standardized packages (31) on said horizontal conveyor systems and for vertically lifting said standardized packages on said vertical lift means.

17. The system of claim 16, further comprising a plurality of dollies (32) and a plurality of countertop elements for assembling a trolley by setting at least one standardized package (31) on a dolly and covering said package with a countertop element (33).

18. The system of claim 16, wherein a set of standardized package dimensions (axbxc) is so selected that the whole number multiples of said dimensions provide at least one or more packages which together with said dolly and said countertop element form a structure having the dimensions of a standard trolley.

19. A supply system for passenger aircraft comprising a cabin space, a cargo space, a floor separating said cabin space from said cargo space, a flight attendant work area (2) on said floor in said cabin space for distributing supplies, a catering container (3) as part of a freight loading system in said cargo space below said work area (2), a plurality of trolleys for containing supplies, horizontal conveyor means in said catering container for horizontally moving said trolleys into and out of a stationary lift position in said catering container, vertical lift means extending through said floor for transporting said trolleys from said stationary lift position (11) into said work area and vice versa, said horizontal conveyor means in said catering container comprising transport carts (9) for said trolleys, said supply system further comprising a computer and sensor means including control means connected to said computer, to said horizontal conveyor means, and to said lift means for operating said supply system, and wherein said horizontal conveyor means comprise two horizontal conveyor systems (7C and 7D) arranged in said catering container (3B), each horizontal conveyor system having one said stationary lift position (11) aligned with said vertical lift means for horizontally transporting standardized packages (31) on said horizontal conveyor systems, and for vertically lifting said standardized packages on said vertical lift means.

20. The supply system of claim 19, further comprising a waste holding area in said catering container.

21. A supply system for passenger aircraft comprising a cabin space, a cargo space, a floor separating said cabin space from said cargo space, a flight attendant work area (2) on said floor in said cabin space for distributing supplies, a catering container (3) as part of a freight loading system in said cargo space below said work area (2), a plurality of trolleys for containing supplies, horizontal conveyor means in said catering container for horizontally moving said trolleys into and out of a stationary lift position in said catering container, vertical lift means extending through said floor for transporting said trolleys from said stationary lift position (11) into said work area and vice versa, said horizontal conveyor means in said catering container comprising transport carts (9) for said trolleys, said supply system further comprising a computer and sensor means including control means connected to said computer, to said horizontal conveyor means, and to said lift means for operating said supply system, and wherein each of said trolleys comprises a dolly (32), and a countertop element (33), said system further comprising standardized packages of such a standardized size that at least one package (31) on said dolly covered by said countertop element forms said trolley.

22. The supply system of claim 21, wherein a set of standardized package dimensions (axbxc) is so selected that whole number multiples of said dimensions provide at least one or more packages which together with said dolly and said countertop element form a structure having the dimensions of a standard trolley.

* * * * *